July 1, 1958  J. M. BOISVIEUX  2,841,649
PULSE CODE MODULATION SYSTEM
Filed Sept. 21, 1951  13 Sheets-Sheet 1

INVENTOR
J. M. BOISVIEUX
BY Stone, Boyden & Frack
ATTORNEYS.

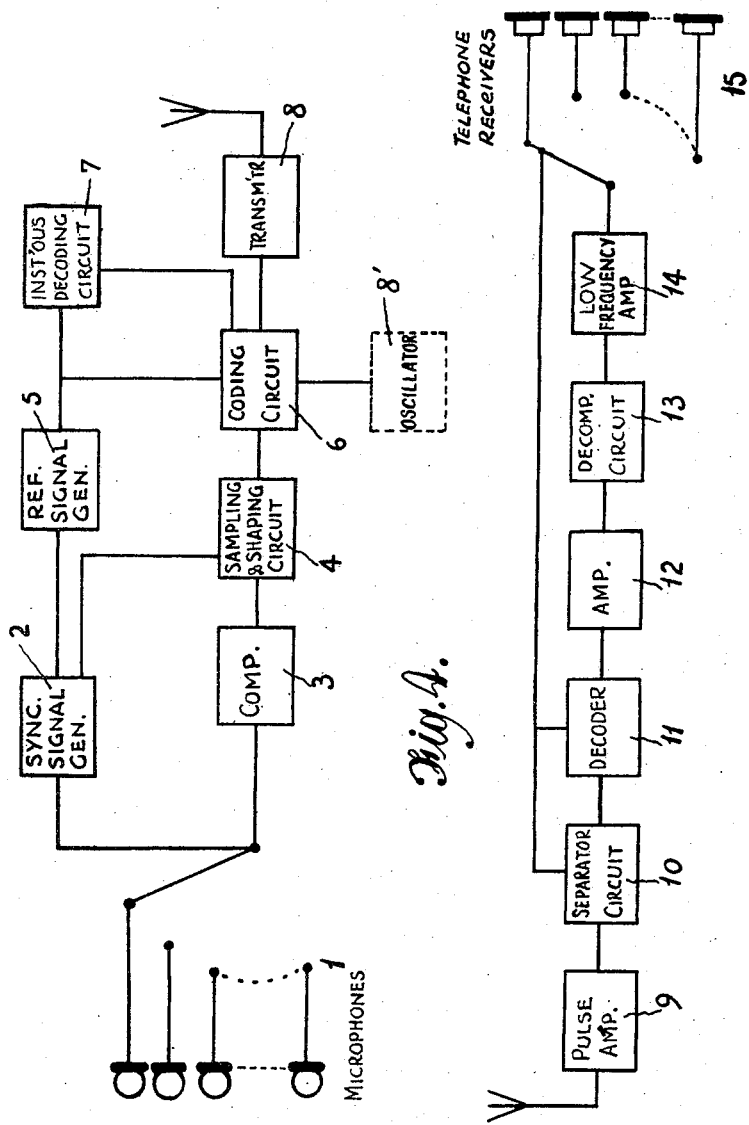

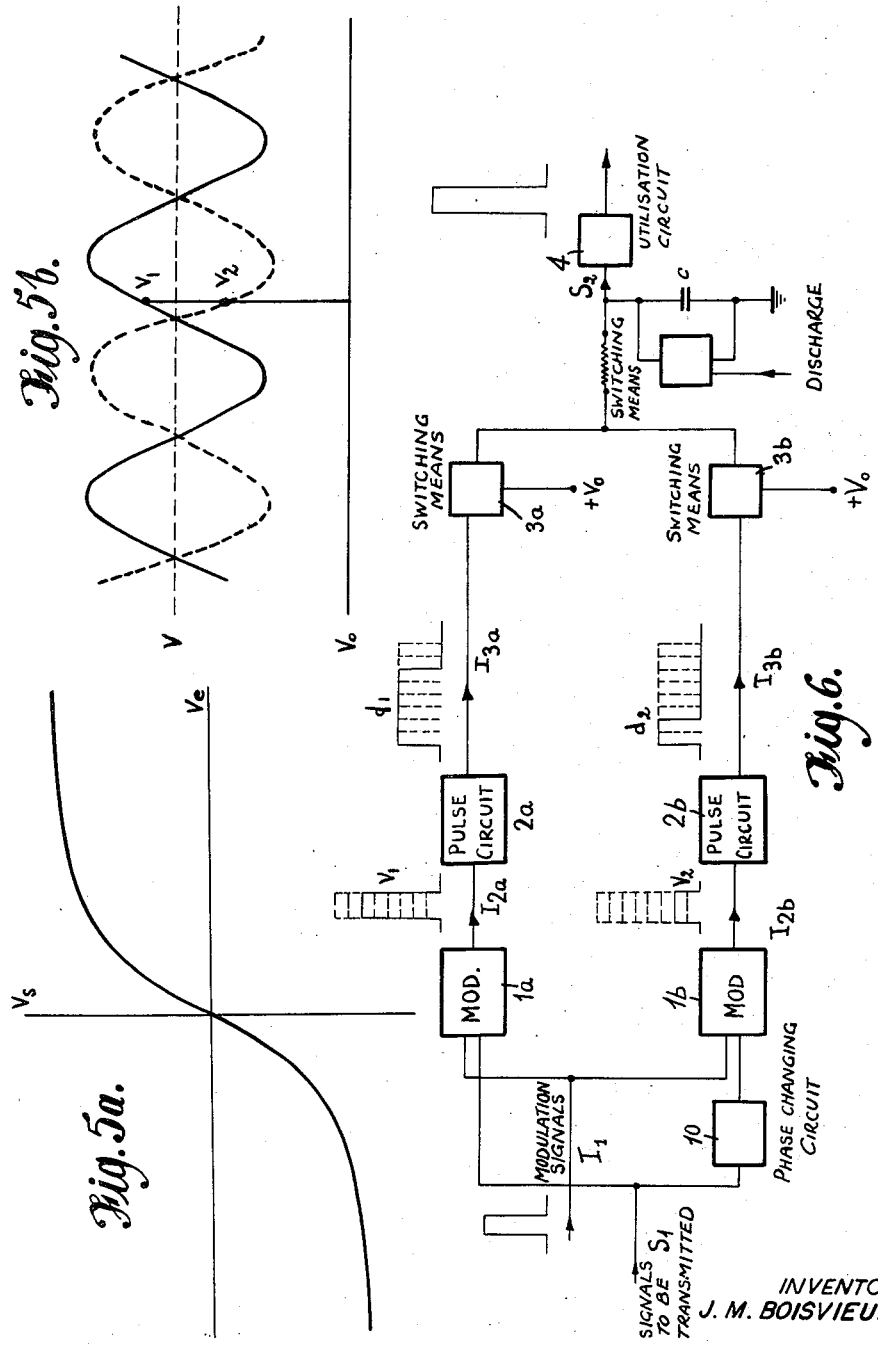

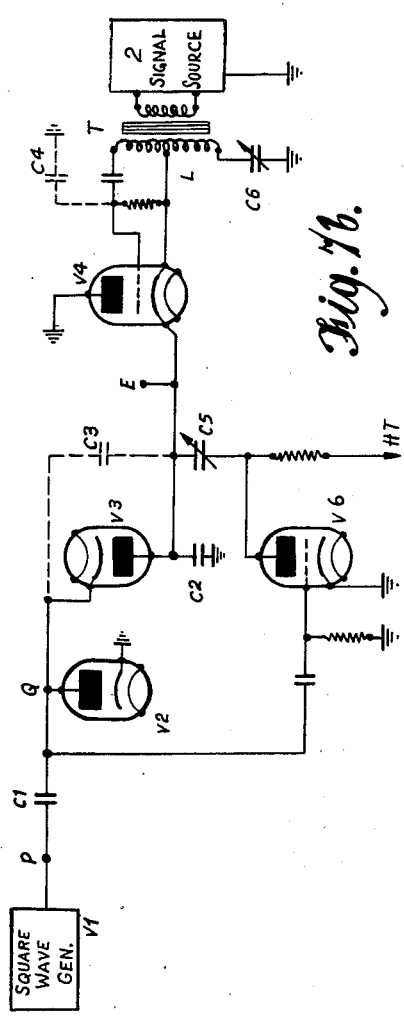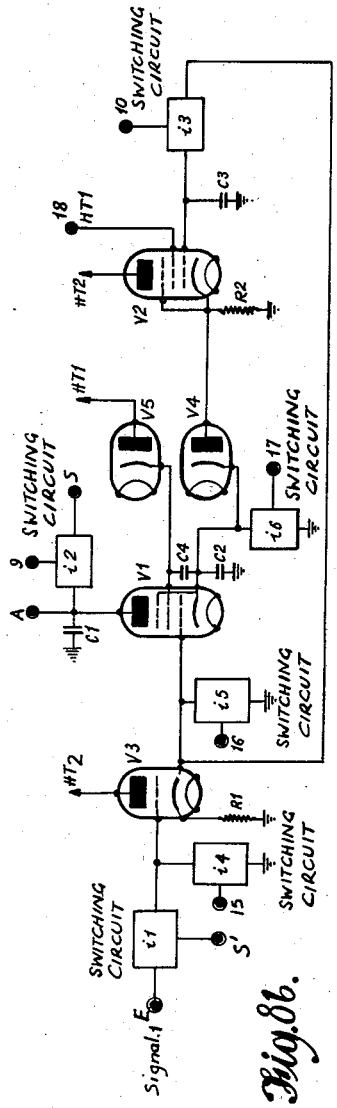

July 1, 1958  J. M. BOISVIEUX  2,841,649
PULSE CODE MODULATION SYSTEM
Filed Sept. 21, 1951  13 Sheets-Sheet 7
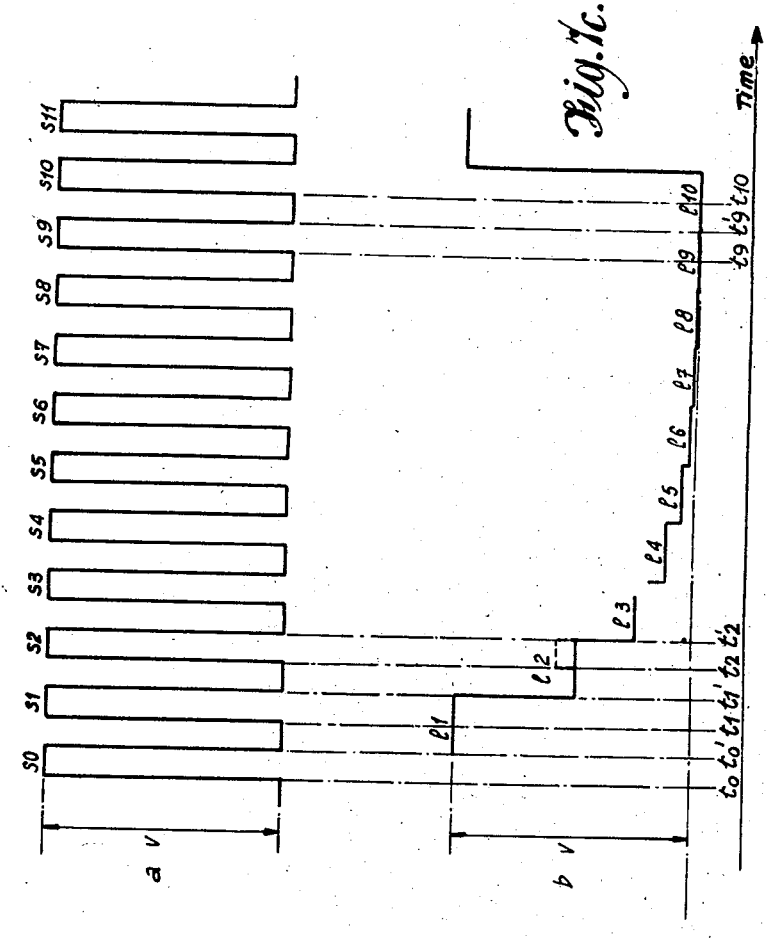
Inventor
JACQUES MAURICE BOISVIEUX,
By
Attorneys July 1, 1958
J. M. BOISVIEUX
2,841,649
PULSE CODE MODULATION SYSTEM
Filed Sept. 21, 1951
13 Sheets-Sheet 8
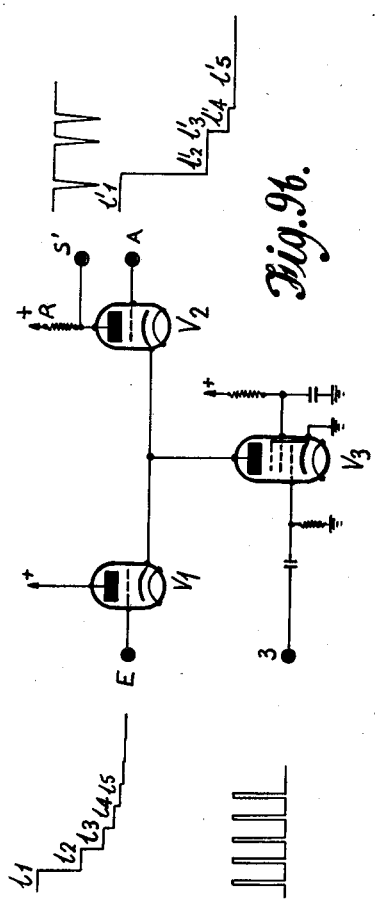
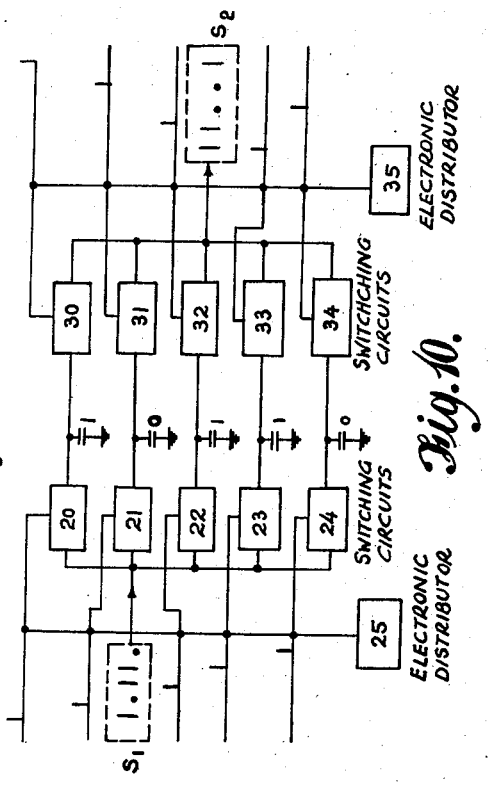
INVENTOR
J. M. BOISVIEUX
BY
*Stone, Boyden + Mack*
ATTORNEYS.

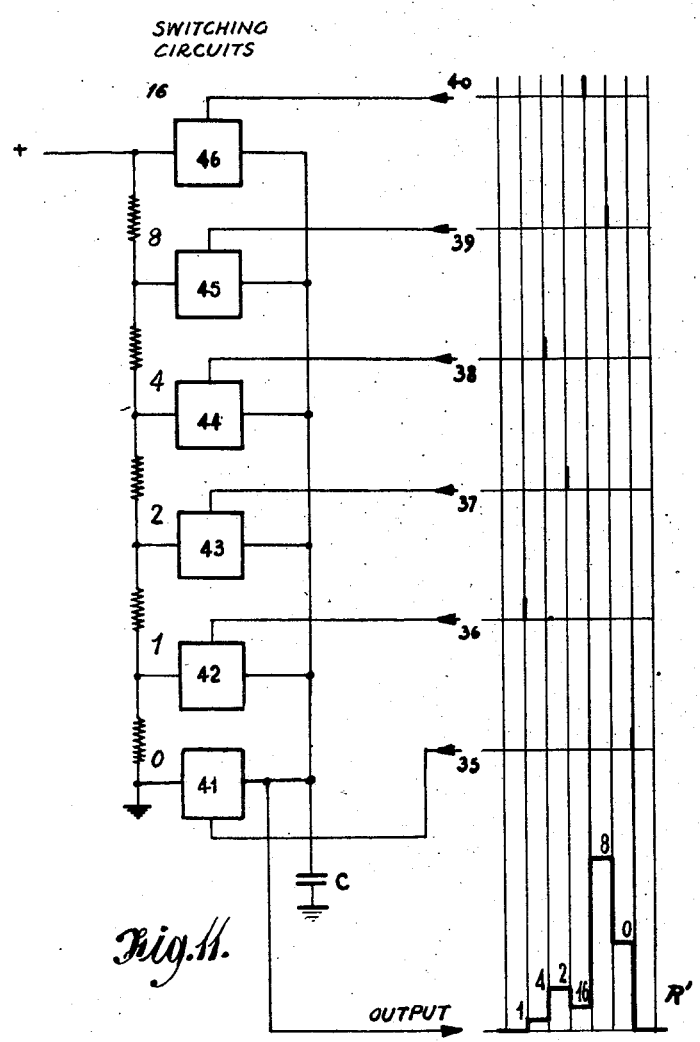

July 1, 1958  J. M. BOISVIEUX  2,841,649
PULSE CODE MODULATION SYSTEM
Filed Sept. 21, 1951  13 Sheets-Sheet 10

Inventor
JACQUES MAURICE BOISVIEUX
By
Stone, Boyden & Mack
Attorneys

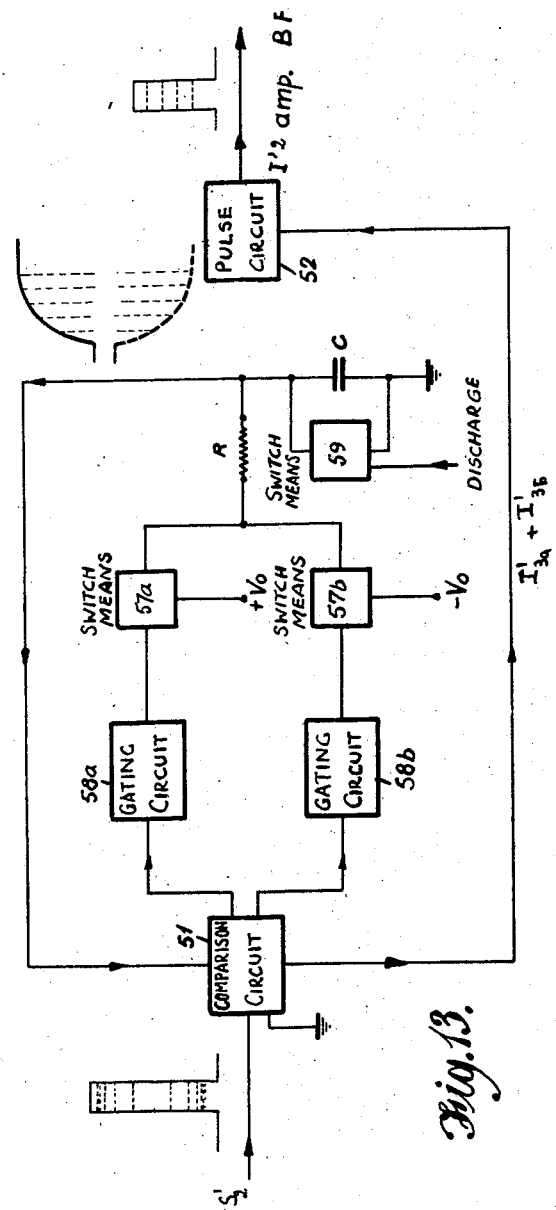

July 1, 1958 J. M. BOISVIEUX 2,841,649
PULSE CODE MODULATION SYSTEM
Filed Sept. 21, 1951 13 Sheets-Sheet 12
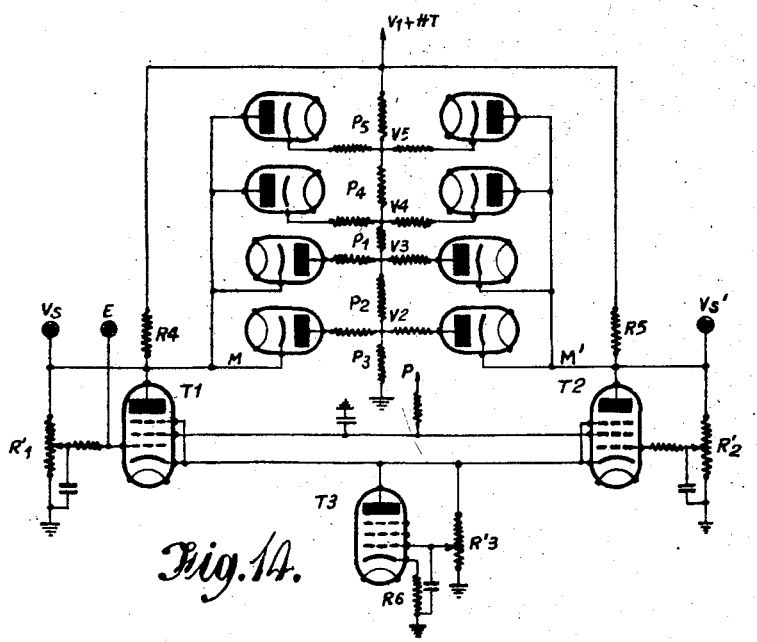
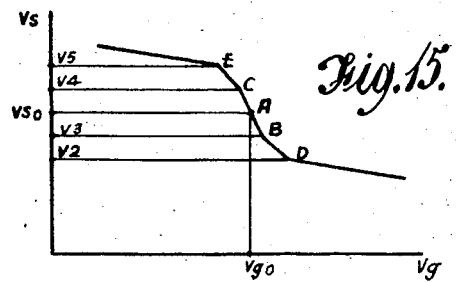
Inventor
JACQUES MAURICE BOISVIEUX,
By
Attorneys

United States Patent Office 2,841,649
Patented July 1, 1958

---

2,841,649

PULSE CODE MODULATION SYSTEM

Jacques Maurice Boisvieux, Gennevilliers, France, assignor to Compagnie Francaise Thomson-Houston, Paris, France Application September 21, 1951, Serial No. 247,621

Claims priority, application France September 22, 1950

19 Claims. (Cl. 179—1.5)

The present invention relates to a pulse code modulation communication system and more particularly to the devices for coding and de-coding and is characterised principally by its simplicity, which permits the manufacture of equipments of small bulk at a reasonable price, and which are easy to keep in repair.

Before stating the means for putting the invention into operation it is necessary to recall succinctly the problems relating to the establishment of pulse communication systems. As is well known such communication is based on the fundamental rule that: if one measures the amplitude of a signal at two recurring instants of which the repetition frequency is at least equal to twice the signal frequency (2F) and if then one reconstitutes the variations of that signal from the values of amplitude previously measured, there is only a single signal of which the component frequencies are less than the signal frequency (F) and whose amplitude passes through these values in the instants considered. The restored signal is therefore identical to the transmitted signal. The signal is therefore transmitted in the form of a discrete series of instantaneous values of amplitude. In coded transmission the signal is submitted to sampling and quantization. This consists in comparing the measured value with a limited number of reference levels occurring between two limit values the range between the limit values may equal the measured amplitude. Instead of transmitting the measured value one transmits that level which is equal to, or immediately below it. In practice, the combination of the successive levels corresponding to the successive measured amplitudes is translated into a binary number in which the digit 1 is represented by a pulse and the digit 0 by the absence of a pulse at the corresponding units of the code.

It is well known that the transmission may be made of one or more channels because the duration of transmission of the coded group corresponding to one measured amplitude may be small with respect to the recurrence rate of the measured amplitudes. In the interval of time between two groups of code pulses, those relative to one or more other signals may be interposed.

The process of transmission of coded pulses utilising a binary code uses the principles inherent in a communication system in which the signal is translated by the existence or the non-existence of a pulse. It allows extremely large tolerances on the amplitude, the durations and the forms of the pulses used without the quality of the transmitted signal being effected.

In particular the noise which is superimposed on the signal in radio communication systems only reveals its presence if it causes an error of translation by the presence or absence of a pulse, that is to say in practice, if the maximum value of parasitic signal attains half the amplitude of the signal, in the case of transmissions using the binary code. The practice of only transmitting a discrete series of levels produces in the signal reconstituted by the receiving equipment the appearance of sudden variations of amplitude at the time of passing from one level to another. These sudden variations introduce into the signal a distortion which is translated by the appearance of a noise similar to the whistle of amplifiers and called "quantization noise." Its amplitude is proportional to that of the sudden changes of amplitude, that is to say inversely proportional to the number of levels used in the quantization. In the case of amplitudes smaller than the maximum value measurable, it is evident that the rate of distortion will be the same as if one used a scale of which the number of levels corresponded to the maximum amplitude of the signals, if the levels of the reference scale are all equal. The distortion is therefore more important on the small amplitude signals. To attenuate this effect it is preferable to use levels of non-uniform value, known as non-uniform quanta. The difference in amplitude between two successive levels may be made proportional to the measured amplitude, which has the effect of making the signal to noise ratio substantially constant as a function of the measured amplitude.

There are various different solutions to these various problems of which the respective merits cannot be discussed here.

The method of transmission according to the invention, which will now be broadly described with reference to the explanatory graphs of Figures 1, 2 and 3 consists essentially in measuring the amplitude of a signal such as the signal S in Figure 1 at a discrete series of equidistant instants $t_1, t_2 \ldots t_n$, repeated at a frequency more than double the frequency of the highest frequency of the signal to be transmitted.

The amplitudes of the signal at the instants $t$ are compared with a discrete series of reference amplitudes equal in number to the number of digits of the code. The smallest variation of amplitude detectable, often called the quantum, may or may not be uniform, that is to say it may vary as a function of the number of quanta already measured. There is shown in Figure 2 a reference signal usable with the systems according to the invention. It comprises five steps, the amplitudes of the different steps in a geometric progression of the ratio 2. It will be understood that this scale of measurement constitutes a particular case and that any convenient scale of amplitudes may be used which is convenient. The latter has only been chosen for its simplicity in order to make the explanation more clear.

The coding according to the invention in a binary system is effected in the following known manner; the instantaneous amplitude of the signal, at any given instant $t_1$, is compared successively, and by order of decreasing amplitude, with the different steps of the reference signal. When the amplitude of the signal, reduced by the amplitude already measured by the preceding step, is greater than that of the step being considered, a pulse is produced and where the signal is smaller than the step being considered, no pulse is produced. This operation is shown graphically by Figure 3. There is shown at the left of Figure 3 the reference signal similar to the signal of Figure 2, which measures the amplitudes. In dotted lines 1, 2, 3, 4, 5, is shown the instaneous amplitude of the signal S of Figure 1, at the timing interval $t_1$. There is shown below, the coded signal produced by the circuit arrangements according to the invention. The signal at the right of Figure 3, comprises the decoded signal derived from the coded signal, it is necessary to successively remove this signal from the modulation signal before proceeding to the comparison with the next lower step.

If one considers the first instant corresponding to the step AB, the signal has an amplitude greater than AB, therefore an impulse $a$ is generated.

It is then necessary to compare the remainder of the signal, that is to say the smaller fraction of the signal beyond the point $M_1$ with the following step CB. For this purpose, the peak of the complete signal is aligned on the second step and one subtracts from it the right-hang signal of amplitude $B'A''$, equal to AB at the end of the level B. The signal in the position 2 cuts the ordinate corresponding to $A''$ at $M_2$. Therefore at the second instant an impulse $b$ is generated.

The signal in position 3 is then, after subtraction of an amplitude equal to the sum of the two first levels ($B'A'' + A''C'$), compared with the amplitude DB of the third step. It can be seen that the amplitude of the remainder of the signal is smaller than the third step therefore, at the third instant no pulse is generated. The remaining portions of the signal are compared with the remaining steps of the reference signal in a similar manner.

These operations are equivalent to those which are effected in the course of calculating a large number in a binary number system. It is pointed out here, that the means according to the invention are usable in a coding system having any number of digits and using a numeration system on any base, it is simply necessary to modify the number of steps of the measuring signal which does not present any difficulty. Although one can use any longer base, the use of a base system different from 2 means the comparison of the signal at the same step more times in each series.

In one simplified embodiment one may use as the reference signal, an exponential curve obtained for example, by the charge or discharge of a condenser instead of the exponential stepped signal used in the embodiment described. The function of the system remains the same, although to obtain the same quality of information, it is necessary to use channel signals of which the phase is known with a much greater precision than in the case of a stepped signal. This results in the same form of signal, the amplitude of the stepped signal remaining substantially constant during the duration of one step, although that of the exponential signal varies in a continuous manner. However, in transmission systems not requiring great fidelity one may be satisfied with an exponential reference signal of simple form.

According to the invention, the circuit generating the reference signal is essentially constituted by a condenser charged to a constant voltage at the beginning of each group of code pulses, said condenser taking a charge corresponding to a constant fraction and equal to a half of the charge accumulated at each of the successive instants of the code. The coding is effected in an addition circuit which is very simple essentially comprising a tube which receives the channel pulses and acts as a switch means which is open only if the amplitude of the reference signal is less than that of the sample measured (and accumulable at the terminals of the condenser), minus the amplitude already coded, and produced by decoding.

The decoding at the receiving point, as at the transmitter is effected by discharging, by means of a coded signal, a condenser of which the initial charge is known; the lost charges develop between its terminals a voltage proportional to the amplitude of the reference signal at the corresponding instant. The residual voltage at the terminals of the said condenser is then measured.

The non-uniformity of the steps serving for the reference measurement is obtained by submitting the signal to a non-linear transformation of amplitude before coding, the instantaneous compression of the amplitude. The signal is cut up into sampling pulses modulated in amplitude which are converted into impulses modulated in time serving to control the charge of a condenser under constant voltage. The duration of the pulses received at the terminals of the condenser is then coded. For the reconstitution of the signal an identical condenser is used, which has been charged at a constant voltage until it has a value equal to that of the incident signal, the restored signal having an amplitude proportional to the duration of the charge.

According to a simplified variation of the invention, useful notably for a service channel or a control system, the instantaneous amplitude compression is obtained with the aid of amplifier circuits of which the gain takes a group of discrete values which are a function of the instantaneous amplitude of the incident signal. These amplifiers are balanced in a manner to suppress the distortions due to the even harmonic, and a system of feedback at the modulation frequency, and as a direct current, assures a corresponding linearity between the characteristics of the gain of the amplifiers used at the transmitter and in the restoration.

The invention will be better understood with reference to the description which follows and to the attached drawings, given simply by way of non-limiting example, and in which:

Fig. 4 shows a diagram of a communication system according to the invention,

Figs. 5a and 5b are curves showing the operation of the compression circuit,

Fig. 6 shows the compression circuit,

Figure 7A:
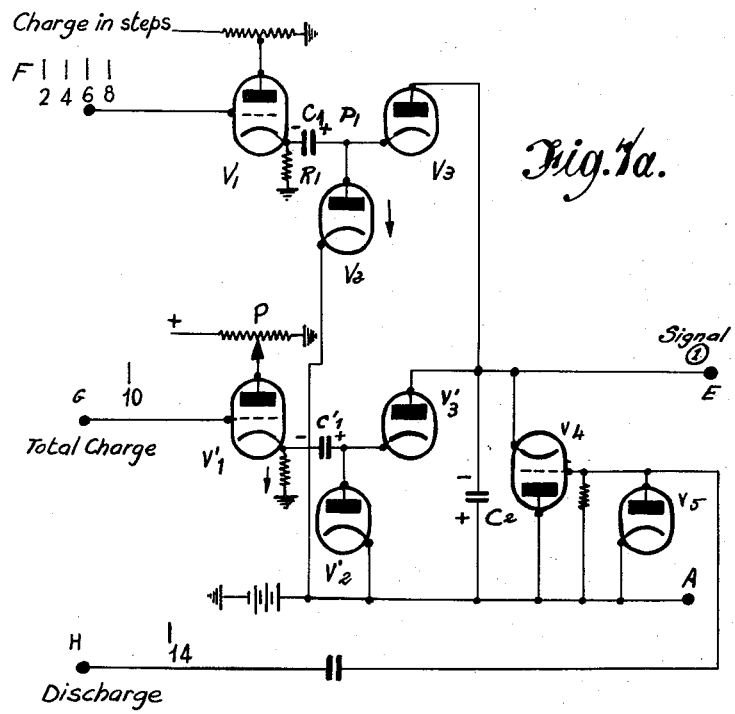
Fig. 7a shows a circuit for generating the reference signal.
Figure 9A:
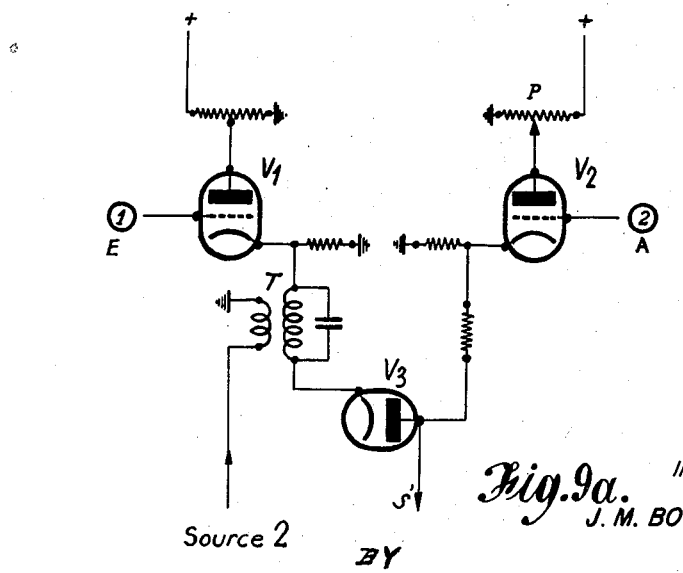
Figure 8A:
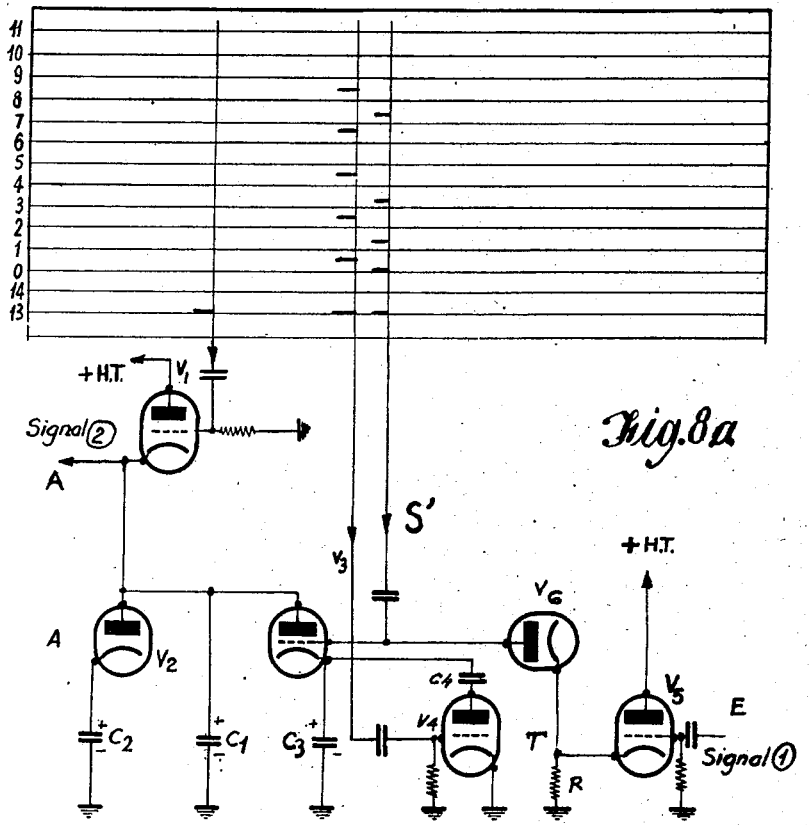
Figure 12:
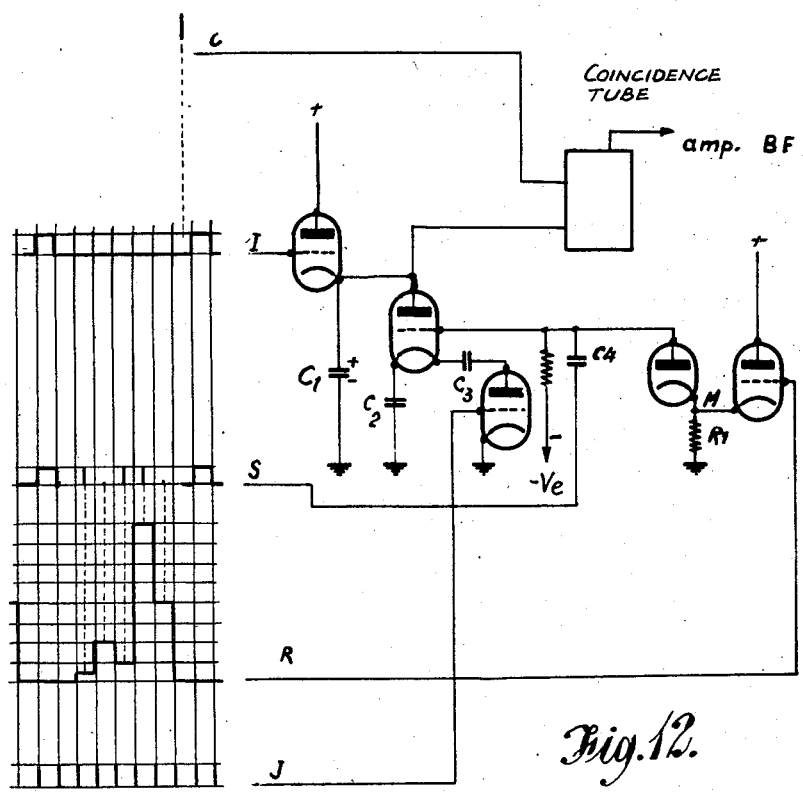
Figure 16:
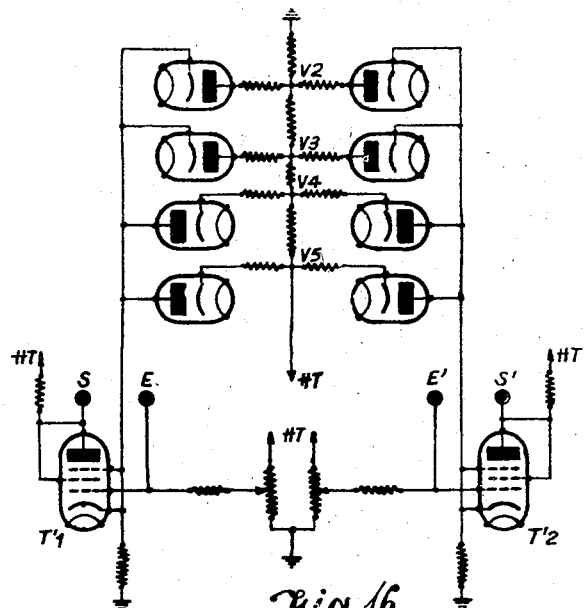
Figure 17:
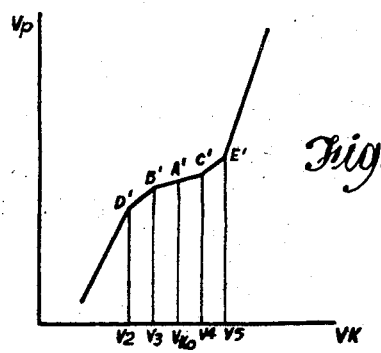

Fig. 7b shows a preferred embodiment of a circuit for generating the reference signal, Fig. 7c shows explanatory curves, Fig. 8a shows an embodiment of the instantaneous decoder, Fig. 8b shows a preferred embodiment of a decoder, Figs. 9a and 9b show two forms of a coding circuit, for comparing the transmitted amplitude with that of the reference signal, Fig. 10 shows an auxiliary circuit for assuring the secrecy of the transmission, Figs. 11 and 12 show another embodiment of the decoder, Fig. 13 shows an embodiment of the decompression circuit, Figs. 14 and 15 show a simplified decompression circuit and its characteristic curve, Figs. 16 and 17 show a simplified compression circuit and its characteristic curve.

Figure 4 shows, in diagrammatic form, a multiplex communication system according to the invention. The different elements constituting this communication system will be briefly described before describing in detail the circuits and operation of the invention.

The upper part of the figure shows the transmitter. The signals to be transmitted from the microphones 1 are transmitted through a selector to the chain comprising the compressor 3, the sampling and shaping circuit 4, and the coding circuit 6, feeding the transmitter 8. The selector is controlled by synchronising pulses from a synchronising signal generator 2, which also synchronises the reference signal generator 5 and the sampling circuit 4. The coding circuit 6 receives as well as the modulation signal from 4, the reference signal from 5 and the decoded signal from 7. The circuit 6 constitutes what has been called the addition circuit, in which the coding is effected. The transmitter 8 does not form part of the invention and will not be described in the following, likewise the generator 2 which generates the synchronising signals and the service signals.

The receiver shown on the lower part of the figure comprises essentially a pulse amplifier 9, feeding a synchronising and service signal separator circuit 10 controlling, on the one hand the receiver chain and on the other hand the distributor controlling the feeding to one of the telephone receivers 15. The receiver chain comprises essentially a decoder 11 feeding through a separator amplifier stage 12, the decompression circuit 13, which finally feeds the frequency amplifier 14, connected to the telephone receiver.

The above system corresponds to a relatively complex complete communication system. Certain elements may, for reasons of simplicity and economy, be eliminated, notably the compressor 3 and its corresponding decompression circuit 13.

There has been shown a communication system of the multiplex telephony type, but it will be understood that the invention is applicable equally to a single channel communication system, or to the transmission of signals of a different nature and notably unidirectional signals corresponding to the measured results. The communication system therefore serves for range-finding and telecontrol.

There has been illustrated a telephony system which corresponds to the transmission of symmetrical signals; it will be understood however, that a telegraphy system or a unidirectional telecontrol system may come equally within the scope of the invention with the aid of more simple circuits particularly those relating to compression and expansion.

As has been said above, the arrangement of the compression and expansion devices submits the signals coming from the microphone, after possible amplification, to the following operations:

(a) The signal is cut into pulses of an amplitude equal or proportional to the instantaneous value of the said signal, (b) The pulses modulated in amplitude are transformed into pulses modulated in time, (c) A condenser is charged under a constant voltage through a resistance during a period equal to that of a pulse, (d) The signals compressed in amplitude received at the terminals of the condenser are transmitted, (e) The signals compressed in amplitude are detected, (f) One restores the initial amplitude, by using the charge of a condenser identical to the condenser at (c) to the value of the incident signal, an auxiliary circuit measures the duration of the charge.

(g) The pulses modulated in duration are transformed into pulses modulated in amplitude or directly detected.

The curve of Fig. 5a represents the symmetrical compression characteristic with respect to the mean level of the signal.

In order to effect a symmetrical compression with respect to the mean level of the amplitude to be measured, in the case of sinusoidal signals, the amplitude measured with respect to the given reference level is transformed into an amplitude measured with respect to the mean value of the signal in the following manner (Fig. 5b). One measures by any known means the instantaneous amplitude of the signal V1 and simultaneously the instantaneous amplitude V2 of the same signal phase shifted 180° the phase shifting being effected by any known means. The sum of the two reference amplitudes is equal in value, to double the instantaneous value of the signal measured with respect to its mean level. The pulses modulated in amplitude are transformed in the manner which has been specified above into two series of pulses modulated in time. The compression is effected, as previously mentioned by charging a condenser to a voltage through a resistance during a period proportional to the difference of duration of two corresponding pulses, this charge being derived from two sources of the same value but of inverse polarity according to the sign of the difference. It is sufficient then to measure, with respect to a continuous voltage, the amplitude at the terminals of the condenser. It will be understood that the continuous reference voltage must be chosen in such a manner that the modulation signal has always the same polarity with respect to that of the reference voltage.

There is shown in Fig. 6, the compression circuit receiving on the one hand the pulses $I_1$ of a constant recurrence frequency and amplitude, and on the other hand the symmetrical modulation signals $S_1$. The latter are transmitted on the one hand directly to an amplitude modulator $Ia$ and on the other hand through a phase changing circuit 10, assuring a phase change of 180° in all the range of frequencies to be transmitted, to a similar modulator $Ib$. One obtains therefore two pulses $I_{2a}$ and $I_{2b}$ modulated in amplitude according to the signal $S_1$ and the signal $S_1$ phase-shifted through 180°. These pulses feed the circuits $2a$ and $2b$ which transform the pulses modulated in amplitude $I_{2a}$ and $I_{2b}$ into pulses modulated in duration $I_{3a}$ and $I_{3b}$ respectively.

This circuit known in itself, comprises for example a sawtooth voltage generator having the same recurrence frequency as that of the pulses $I_1$. The modulated pulses $I_2$ are compared with the sawtooth signal and a gating circuit allows the production of pulses having a determined origin and an ending defined by the equality of the amplitude of $I_2$ with the sawtooth voltage. There are thus obtained trains of pulses $I_3$ modulated in time.

As is shown on the figure, the leading edges of pulses $I_{3a}$ and $I_{3b}$ coincide. The pulses $I_{3a}$ and $I_{3b}$ control respectively two switching circuits $3a$ and $3b$. These have for a purpose to connect an RC integrator circuit to a D. C. voltage source at the potential $+V_0$, and to a D. C. voltage source at a potential $-V_0$ during the duration of pulses $I_{3a}$ and $I_{3b}$ respectively.

The voltage at the terminals of the condenser C is transmitted to the output circuit 4. An auxiliary circuit 6 periodically discharges the condenser C to zero at the recurrence frequency of the impulses $I_1$.

It may be assumed, as is shown in the figure, that the amplitude V1 measured with respect to a reference voltage is greater than the amplitude V2. Under these conditions the duration $d1$ of the corresponding pulse $I_{3a}$ is greater than the duration $d2$ of the corresponding pulse $I_{3b}$. The switching means $3a$ is therefore open for a greater time than the switching means $3b$ and the condenser C is charged during a period $d1-d2$ by the voltage $+V_0$.

In the case where the period $d2$ would be greater than the duration $d1$, the condenser is charged by the voltage $-V_0$ during the period $d2-d1$.

There is produced therefore, at the terminals of the condenser C, voltages of a variable polarity and amplitude transmitted by means of a switching circuit for example an electronic switch, to a utilisation circuit 4, which is the circuit 4 of Figure 4.

Figure 3:
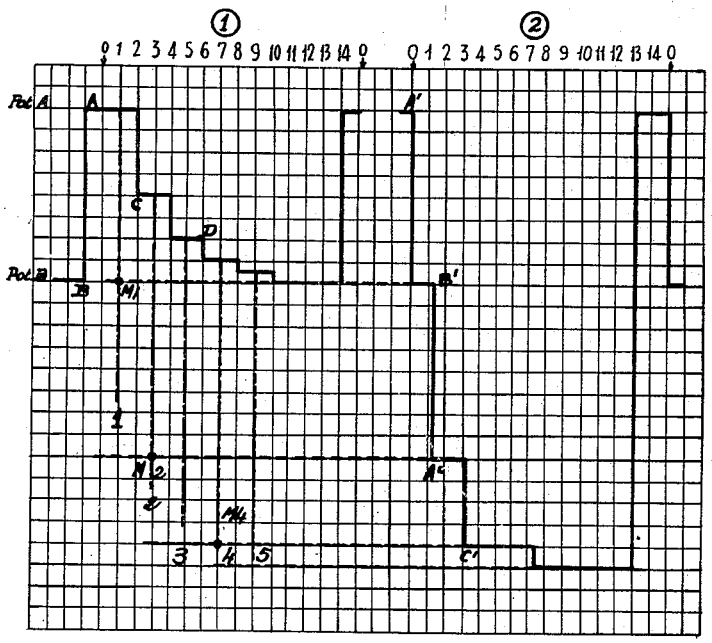

There is shown in Figure 7a the circuit of the reference signal generator 5 producing the reference signal of Figure 3. This signal appears between the points A and E at the terminals of a condenser C2, which in the course of operation acquires negative charges corresponding to the differences of potential between the levels of two successive steps of the signal. The tubes V1, V2, V3 comprise a first charging circuit for C2, the tubes V'1, V'2, and V'3 comprise a second charging circuit and may be omitted in certain cases where it is possible to sacrifice a little of the quality of the transmission. The tubes V4 and V5 comprise the discharge circuit of the condenser C2.

As is apparent, the potential of the conductor joined to the terminal A is fixed at a constant value corresponding to the potential A of the maximum amplitude step of the signal 1 by reason of an auxiliary source of voltage not marked with a reference. It may be supposed, as an example, that at the instant 14 (see Figure 3) one will find a negative charge corresponding to the amplitude AB of the maximum step is accumulated at the terminals of C2. A pulse H produced periodically at this instant of the period triggers the tube V4, normally cut off and the negative charge of the condenser C2 flows through V4. The diode V5 is provided to limit the excursion of the positive potential at the grid of V4, and to suppress any possibility of the recharge of the condenser C2 with an inverse polarity. The potential of the point E thus finds itself returned practically to that of the point A and remains there. There has thus been obtained the first step of the signal 1. The anode potentials of V₃ and V'3 attain the same value, and the condensers C1 and C'1 are charged by a voltage corresponding to the value of the potential A, the diode V2 limiting to that value the positive potential at P₁. The polarity of the charges is shown on the figure.

At the instant 2 a positive pulse is applied to the channel V1, V2, V3, triggering the tube V1. The condenser C1 discharges through the resistance R1, which triggers the diode V3 which has a cathode bias potential. The current flowing through the diode is provided by the condenser C2 of which the upper plate is charged negatively.

The current flowing in the diode recharges the condenser C1 according to the polarity shown in the figure, the charge accumulated on the latter is such that the potential at P₁ is equal to the potential at E.

The negative charge acquired by the condenser C2 depends on the ratio of the values of the capacities C1 and C2. When these are equal it may be shown that the condenser C2 acquires a negative charge equal to a half of the charge lost by C1 which depends in its turn on the bias voltage of the tube V1. By choosing the latter properly in relation to the value of the potential B (see Fig. 3), corresponding to the reference level of the reference signal, one obtains an accumulation of negative charges corresponding to a lowering of the potential E to a value equal to a half of the difference (potential A—potential B).

The pulses of the signal F (delivered by the circuit 2) trigger V1, starting the discharge of C1 and an increase in the accumulation of negative charges at the terminals of C2 equal to a half of the relative addition to the preceding charge, since at each step, the condenser C1 recharging under a voltage proportional to the difference in potential between E and earth, apart from a constant, acquires a charge which is a half of that acquired during the preceding step.

One may obtain at E the potential B by applying to the channel V1, V2, V3 pulses up to the instant 10 and in a more than sufficient number in order that the equalising of the potentials between the condensers C1 and C2 can be attained with the desired accuracy.

In the circuit shown in the Figure 7a the pulse produced at the instant 10 is isolated and constitutes a signal G exciting the second channel V'1, V'2, V'3 similar to the first channel, with the exception, that the condenser C'1 has a capacity very much higher than that of C2 (100 times for example) in order to ensure a rapid equalising of the voltages. It may be mentioned that the reference signal 1 actually obtained by this process consists in a series of portions of exponential curves, the right angles and horizontal parts shown on the Fig. 3 not being actually obtained.

Fig. 7b shows a variation of the circuit previously described, in particular it functions at greater speed, that is to say with the pulses F of a higher recurrence frequency. For greater simplicity on the drawing the channel V'1, V'2, V'3 defining the zero accurately has been omitted. In effect this may be always omitted whilst preserving a sufficient accuracy by using a reference signal presenting a number of steps greater than that of the number of units of the code used. One obtains the zero level or origin potential, from which one measures the amplitudes, by a simplified process which consists in comparing the potential with one of the steps which would follow that which corresponds to the preceding instant of the code.

In the particular example chosen, it may be shown, that if $p$ is the number of steps of the reference signal and $n$ the number of units of the code ($n=5$), in defining the origin at the zero level of the $p$th step, which is completely defined, and relatively independent of various voltage sources feeding the tubes, there is added on the zero value an error equal to the amplitude of the $n$th step multiplied by $$\frac{1}{2}(p-n)$$

It is possible to make this error negligible by choosing for $p$ a sufficiently high value.

Figure 1:
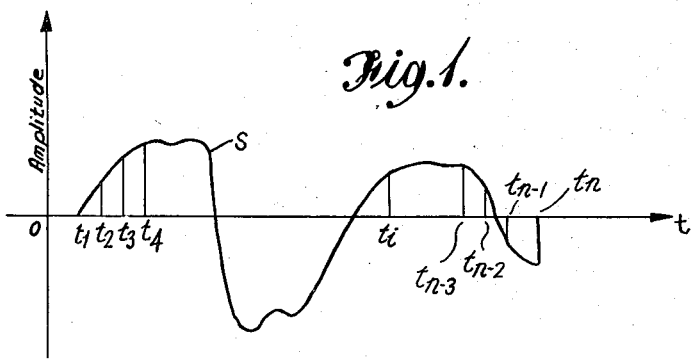
Figure 2:
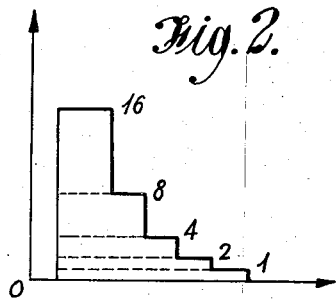

One has shown the source 2 producing square pulse signals at the repetition rate F of the code pulses. These signals are shown on the curve $a$ of the Fig. 7c. There is shown on the curve $b$ of the same figure, in relation to the same time scale, a reference signal containing 10 steps. It will be understood that the number of steps used in the coding, that is to say the number of units of the code, is preferably less than the number of steps generated and that the number 10 has been chosen without any limitations. In a multiplex transmission system the time interval between the 6th and 10th steps inclusive may be used for example for the transmission of another coded signal by means of another coder. There are numbered $s_0$ to $s_{11}$ the successive pulses from 2 corresponding to a single cycle of operation, that is to say to the generation of one reference signal. The instants corresponding to the start of the pulses $s$ are labelled in a similar number $t_0$, $t_1$ etc. . . . $t_{11}$ and carry the same reference numeral. It is as well to point out here, that the instants $t_1$ etc. must not be confused with the instants $t_1 t_2$ etc. of Figure 1 which correspond to the instants when the amplitude of the modulation signal is measured. One makes the different instants $t_1$ etc. which are now being considered, correspond to the successive units of the code serving to represent the instantaneous amplitude of the signal measured at any instant.

There is shown at E, as on Figure 7a, the point where the reference signal appears. At the terminals of the condenser C1, at the arrival of each pulse $s$ a constant charge accumulates, of which a fraction is transmitted to the condenser C2 during the trailing edge of the pulse $s$. At each new pulse $s$ the condenser C1 receives a constant charge and the condenser C2 receives a charge corresponding to a constant fraction of the relative additional charge applied at the terminals of C1. At the initial instant $t_0$ the potential of the point E is returned to that of earth by means of the discharge tube V4 which is triggered at this instant by a discharge pulse from the same source 2 and transmitted to the grid of V4 through the pulse transformer T. The condenser C2 is discharged completely through V4 and when it produces the first pulse $s_1$ of the cycle is produced, the charge accumulated on C2 is nil. The potential of the point P has then a certain value $V_0$ which depends on the nature of the pulse generator circuit 2; the potential at point Q is zero, owing to the action of the diodes V2 and V3 which disperse any positive or negative charge accumulated by C1. At the instant $t_1$ the potential of the point P is brought to the peak value V of the pulse signals $s$. The potential of the point Q is maintained at zero by the diode V2 and the condenser C1 acquires a supplementary charge corresponding to the addition of the voltage V at its terminals. At the instant $t'_1$, corresponding to the falling edge of the pulse $s_1$, the condenser C1 tends to lose its additional charge since the difference of potential at these terminals returns to the initial value $V_0$. The excess of negative charge induced on the plate Q of the condenser C1 tends to dissipate through the diode V3 which charges the condenser C2. If the condensers C1 and C2 are the same value, the points Q and E are carried to a similar potential equal to $$-\frac{V}{2}$$

with respect to earth. The difference of potential at the terminals of C1 is therefore equal to $$V_0 + \frac{V}{2}$$

and the voltage at the terminals of C2 is equal to $$\frac{V}{2}$$

One thus obtains from the end of the pulse $s_1$ the second step of the reference signal. When the pulse $s_2$ arrives at P, the potential at this point recovers the value $V_0+V$ and the condenser C1 charges therefore under a difference of potential equal to the increase $$\frac{V}{2}$$

of the voltage at its terminals. It acquires therefore a charge equal to a half of the charge acquired during the preceding pulse. At the instant $t'_2$, the potential of point P diminishes again and the level of the potential of the point Q becomes negative with respect to earth. The diode V2 is therefore cut off, and the diode V3 is conducting when the potential of the point Q is lower than the potential $$-\frac{V}{2}$$

of the anode of this diode. The diode V3 therefore conducts when the potential of the point Q is between $$-\frac{V}{2}$$

and $-V$. The condenser C2 charges therefore under a difference of potential equal to $$-\frac{V}{2}$$

of the same polarity as previously, and consequently it acquires a charge equal to a half of the preceding charge, and the potential at the point E measured with respect to earth, is $$-\frac{3V}{4}$$

corresponding to the step $l_3$ of the reference signal.

A similar process, is repeated on the arrival of each pulse $s$. The occurrence of the steps $l_4, l_5 \ldots$ etc. corresponding successively to the potentials $$-\frac{7}{8}V, -\frac{15}{16}V -\frac{31}{32}V$$

with respect to earth.

The potential of point E tends asymptotically towards the value $-V$ which would be attained by an infinite number of pulses. If, as has been said above, one generates a reference signal of $p$ steps (with $p=10$), and if there is established a code with $n$ digits, by taking for the limiting value of the reference voltage, that corresponding to the $p$th step, there is introduced an error equal to $$\frac{1}{2}(p-n)$$

times the value of the $n$th step measured with respect to that limiting value. In relation to that value which has been called the reference level or reference zero, the potentials of the $n$ first steps are equal respectively to $$\frac{V}{2}, \frac{V}{2^2} \text{ etc.} \ldots \frac{V}{2^n}$$

When the desired number of steps has been obtained, the condenser C2 is discharged through the tube V4 with the aid of a pulse from the source 2. If the frequency of the signals $s$ is of the order of several hundred kc. s., corresponding to a rapid coding, the condensers C1 and C2 must have low values in order to reduce the time constants of charge and discharge of the said condensers through their associated diodes with respect to the duration of the pulses $s$. On the other hand the capacities of C1 and C2 must be small, in order that the impedance of the circuit looking from the generator 2, remains large. Under these conditions the internal capacity of the diode V3 represented in dotted lines as C3 is not negligible in relation to that of the condensers C1 and C2, and a non-negligible fraction of the signals $s$ is transmitted directly to E through the condenser C3. There appears therefore, during a half of each step of the reference signal, a parasitic signal having the form represented in dotted lines on the step $l_2$ of the Figure 7c. It is arranged to compensate for the parasitic coupling due to the capacity C3, with the aid of a feed-back circuit comprising essentially the variable condenser C5 and the tube V6. Thus, as is shown, the grid of the tube V6 is connected to Q and the amplifier V6, is arranged in such a manner such that the amplitudes of the signals $s$ fed to E through the condenser C5 are equal and of opposite sign to those of the signals transmitted directly by C3. This condition is easy to effect by adjusting C5 correctly.

In the same way, when the repetition rate of the pulses is relatively high, the stray capacity existing between the grid of the discharge tube V4 and the earth is not negligible with respect to C2. This stray capacity is shown in dotted lines as C4. Under these conditions it is not possible to entirely discharge the condenser C2, and the level of the first step of the reference signal is false. The stray capacity C4 is compensated, by disposing between the cathode of V4 and earth a coil L coupled to the transformer T in series with a variable condenser C6. The capacity C6 is adjusted so that the voltage induced in the coil L, and applied to the point E, is equal and of opposite sense to the voltage at the terminals of C4 during the duration of a triggering pulse. Under these conditions the voltage at E only depends on the electronic current through V4 and the discharge of C2 is complete.

Figure 8a shows an instantaneous decoding circuit producing the signal 2 (of Figure 3) corresponding, in accordance with the coding, to the amplitude already measured. This is the circuit 7 of Figure 4.

There is shown at E the input terminal of the decoding circuit 7 connected to the terminal E of the coding circuit 6 (see Fig. 4). Also, in order to align the signal 2, from the point of view of the voltages, on the reference signal, it is necessary to connect the point A of the decoding circuit to the point carrying the same reference in the coding circuit, in the case where one uses the circuit shown in Fig. 7a. The signal 2 is produced at the terminals of the condenser C1. At the instant 13, corresponding to a quiescent instant preceding the transmission of a code signal, a triggering pulse is applied to the tube V1. Under these conditions the condenser C1 charges according to the polarity shown on Fig. 8a. The condenser C2 is charged to the same voltage as C1, producing thus the potential A of the Fig. 3. It comprises the auxiliary source represented by a battery in Fig. 7a. The diode V2 allows this charge but isolates C1 from C2 in the course of the operation. So that the presence of C2 does not disturb the functioning of the circuit of Fig. 7a, the capacity of this condenser is chosen to be in the neighbourhood of one thousand times greater than the capacity of the condenser C2 of Fig. 7a.

Throughout the duration of the cycle of operations, the tube V1 is maintained cut off and the condenser C1 discharges through the discharge circuit constituted by the tubes V3 and V4, and the condensers C3 and C4. At the instant 13, the potential at the grid of the tube V3, which is conducting, is carried by means of the diode V6 to the potential of the point T corresponding to the cathode end of the charge resistance of the cathode follower stage V5 receiving the reference signal 1 at E. The grid of V3 is therefore maintained at the potential B corresponding to the amplitude of the signal 1 of Figure 3 at the instant 13. The tube V4 being triggered at the instant 13, the condenser C3 and the condenser C4 in parallel with it, charge under a voltage corresponding to the potential of the point T starting from the blocking voltage of the tube V3. At the instant 14, V4 and V3 are cut off, the condensers holding their charge. In the instant 0, the potential of point T reaches a value corresponding to the potential A of the signal 1 and the tube V3 is triggered. Its grid potential therefore reaches the potential of the point T. The condenser C3 is charged in dependence on the condenser C1 until the tube V3 is cut off. The voltage at the terminals of C3 is thus added to the difference between the potentials of A and B at the expense of the charge accumulated by C1. The capacities of the condensers C1 and C are equal in the case of steps in the form of a geometrical progression of the ratio 2. The potential at the terminals of C1 is therefore diminished by the amount which is added to the potential at the terminals of C3 and one therefore obtains at the terminals of C2 a fall of potential corresponding to the curve A″B″ of the signal 2. At the instant 0.5 (half way between 0 and 1) the tube V4 is triggered and the condenser C3 discharges through the condenser C4. In order that the discharge may be as complete as possible, one chooses in preference the capacity of the condenser C4 to be in the order of one thousand times that of the capacity of C3. The operation is then repeated. The code pulses S' from the addition circuit 6 of Fig. 4 assure the triggering of V3 which has a grid potential under these conditions, equal to the potential of the point T, that is to say, equal to that of the reference signal 1. The tube V3 conducts until the voltage at the terminals of C3 cuts it off at that level. The charges lost by C1 in the course of each of the successive triggerings of V3, occasioned by the coded pulses S' are proportional to the differences in level of the steps of the corresponding instants of the code. The code pulses are applied slightly delayed, the delay remaining small with respect to the duration of the instant code. After each delayed code pulse, the tube V4 for discharging C3 is made to conduct in order to bring the circuit back to its initial conditions of operation.

In a variation mentioned above, the condenser C1 in the Fig. 8a is charged except for a constant, to the amplitude of the signal to be coded. It is connected, as previously indicated, through 1 to the tube V1 of Fig. 9a (circuit 6), the tube V2 of the same circuit receiving the reference signal 2 of which the potential B is that of C1 for a zero value of signal to be coded. The code pulses discharge C1 from the quantity already measured.

Fig. 8b shows another embodiment of an instantaneous decoding circuit. In this figure, A is the output terminal of this circuit, connected as was said to the coding circuit 6 of Figure 4. It is notably arranged to function in an equipment of which the reference signal generator is of the type shown in Fig. 7b. It presents with respect to the circuit of Fig. 8a, a certain number of improvements directed in particular to stabilising the zero level common to the reference signal and to the signal to be coded, and allowing a rapid and accurate working independent of the voltage fed to the different tubes. There are shown in the form of rectangles $i_1, i_2 \ldots i_6$ electronic switch circuits known in themselves, which receive triggering pulses having the correct phases with respect to the code pulses, which will be specified in the course of the description of the operation of the device, and supplied in a general manner from the generator 2 or from the coding circuit after having been submitted to a convenient delay. There is applied respectively to the input terminals E and S the reference signals and the signals to be coded; the decoding signal being received at the output terminal A. The switching means $i_2$ which is normally cut off, as are all the other switching circuits $i_1, i_2 \ldots i_6$ receives a pulse at the beginning of each cycle of operation (pulses $s_0$ of Fig. 7c). At this moment, the instantaneous amplitude of the coded signal is registered in the form of a charge accumulated in the condenser C1. The signal to be coded is preferably applied to the condenser C1 through a low impedance circuit, for example of the cathode follower type. One receives therefore at A, a signal of which the amplitude corresponds to the instantaneous value of the signal to be coded. Thus, the condenser C1 is allowed to discharge through the tube V1, when the latter is conducting in order to charge the condenser C2. The tube V2 essentially fixes at a stable value the cathode potential of the discharge tube V1 as will be explained in greater detail. Similarly, the circuit constituted by the condenser C4 and the diode V5 essentially acts to stabilise the potential at the screen grid of the discharge tube during its operation. The capacity of C4 is sufficiently high that its loss of charge, by reason of the current circulating in the screen grid of V1, is negligible between two instants of code comprising a pulse. The anode of V5 and the screen grid of V2 (terminal 18) are preferably connected to the same source of stabilised supply voltage $HT_1$. The anode of the tube V2 is joined directly to a source of supply voltage $HT_2$ the same as that of the tube V3. If the amplitude of the signal is greater than the first step of the reference signal, a code pulse appears at the output of the circuit 6, this code pulse slightly delayed by any known means, is applied to the input S' of the switching circuit $i_1$ which is made to conduct. Consequently the grid of the tube V3 is carried to the potential of the first step $l_1$ of the reference signal (see Fig. 7c). The cathode of the tube V3 is carried to the same potential, except for a constant value, depending on the characteristics of the tube (cutoff voltage of V3). The control grid of the stage V1, joined directly to the cathode of V3, is therefore carried to the same potential as the latter. The cathode biasing potential of the tube V1 is such that the latter is then conducting. The condenser C1 then looses a part of its charge to the condenser C2 until the potential of the cathode of V1 is equal to the potential of the grid of that tube, except for a constant. The two condensers C1 and C2 are chosen to be of equal value, the voltage at the terminals of C1 reduces by a quantity equal to the difference between the potential of the first step of the reference signal and that of the cathode of V1, except for the said constant value. Immediately afterwards the same code pulse which has been submitted to a slight delay in a known type of circuit, is applied to the switching means $i_4$ and $i_5$ respectively at the terminals 15 and 16, in order to return the grids of V3 and V1 to earth potential. A pulse slightly delayed in relation to the preceding pulses is then applied through 17 to the switching means $i_6$, in order to discharge condenser C2. The potential of the cathode of V1 recovers its initial fixed value as has been said through the tube V2. In effect the diode V4 prevents the potential of the cathode of V1 from taking a value less than that of V2. The coding pulse relative to the second instant of the code, if there is such a pulse, is applied through S' and the second step of the reference signal is then compared with the difference of potential at the terminals of C1.

If the following instant of the code comprises a code pulse, the potential of the second step of the reference signal is applied to the grid of V3 and from there, except for a constant, to the grid of V1 which is made to conduct. The condenser C1 therefore discharges afresh through V1 and charges C2, and so on. One may show that the successive falls in voltage at the terminals of the condenser C1 correspond to the terms of a geometric progression of the ratio 1/2.

As has been said above, the tube V2 acts essentially to stabilise the cathode potential of V1. To this end, the switching means $i_3$ receives at one instant during each cycle of coding for example during the pulse $s_9$ (Fig. 7c) a triggering pulse constituted by the 9th step of the reference signal. As has been said above, the potential of that step represents with a given approximation, the original potential of the reference signal, the resultant error being equal to $$\frac{n_1}{2^4}$$

times the potential of the last step used. That is to say $l_5$ in the case considered. It is evident that if one wishes to constitute a code comprising a very large number of digits, in order to obtain a high accuracy, it is necessary to constitute a reference signal comprising an equal number of supplementary steps. If one wishes to obtain a better approximation with respect to the reference levels of the potentials, it suffices to use a reference signal having a very large number of steps, and to stabilise the potential of the discharge tube V1 to a very high order. The two tubes V1 and V2 are chosen with characteristics as similar as possible, and with their screen voltages equal, after each instant of code it can be shown that their cut off voltages are equal and that the variations of voltage at the terminals of C2 have exact amplitudes equal to those of the steps measured with respect to the reference level.

It will be understood that the arrangement comprising the diode V4 and the switching circuit $i_6$ may be replaced by a single switch which connects the cathodes of V1 and V2, when it receives a pulse through 17.

The Figs. 9a and 9b show two very similar embodiments of the addition or coding circuit 6 of Fig. 4, in which takes place the comparison between the reference signal and the measured amplitude, which may be reduced by the fraction already coded. The circuit of Fig. 9a comprises essentially two tubes V1 and V2 of which the supply voltages and the characteristics are as similar as possible. The equality of these characteristics may be obtained notably by adjusting the anode supply voltage of V2 by regulating the slider of the potentiometer P. In order to avoid any interaction between the signal sources 1 and 2 (circuits 5 and 7 of Fig. 4) the two tubes V1 and V2 are cathode follower stages. The voltage corresponding to the decoding signal is applied from terminal A to the anode of a diode V3 through the tube V2 and the voltage corresponding to the signal, constituted by the instantaneous amplitude of the modulation voltage aligned on the successive steps of the reference signal is applied from terminal E through tube V1 on to the cathode of that same diode which receives in addition the channel pulses, that is to say the groups of unmodulated code pulses delivered from the oscillator 8'. These pulses are injected into the cathode circuit of V3 through the secondary of a transformer T, and are presented in the form of a high frequency carrier wave modulated in amplitude and not in the form of rectangular signals. The introduction of the high frequency carrier wave is only in order to simplify the comparison circuit. The comparison is effected automatically by the diode V3, of which the electrodes are carried at D. C. potentials corresponding respectively to the signals 1 and 2. The coded signal is received through S' in the anode circuit of V3.

According to a variation, the signal to be measured is transmitted, for example through 1, to the tube V1 the stepped reference signal being applied through 2 onto the tube V2. It is then necessary to remove from the signal applied to V1 the signal already measured. This result may be obtained by sending the coded pulses received through S' into a demodulator circuit 7 (Fig. 4) controlling a subtraction circuit feeding the tube V1 (E).

The circuit of Fig. 9b essentially comprises three tubes V1, V2, V3 as in the preceding circuit. The two tubes V1 and V2 which may be triodes or pentodes are identical and their cathodes are joined directly to the anode of a pentode tube V3. The anode of the tube V1 may be joined directly to a source of anode supply and that of tube V2 is connected to this source through a resistance R. The tube V1 receives through E the reference signal, for example that of Fig. 7c. The tube V2 receives from A a complex signal corresponding to the modulation signal reduced by the amplitude already coded during the preceding instants of the code. The tube V3 receives at 3, the code pulses. It will be understood that one may interpose between the point E of the circuit of Fig. 9b and the grid of the tube V1, a chain of amplifiers and one or more buffer stages of a known type presenting a high impedance towards the reference signal generator, and a low impedance towards the input impedance of the tube V1. The reference signal applied to the grid of the tube V1 is such that the potential of the smallest step of the reference signal is positive.

The supply voltages to the electrodes of the tube V3 are adjusted so that the tube is cut off in the absence of code pulses and delivers a constant current during these pulses. This result is obtained by stabilising by any known means the potential of the screen grid of V3. Thus, as has been said above, the successive steps of the signal applied through V2 are slightly delayed with respect to the corresponding instants of the code, the delay being small with respect to the duration of the steps of the reference signal, since it is necessary in order to produce the signal applied through V2, to proceed with the instantaneous decoding of the coded signal. The steps applied through V1 corresponding to the same instants of code of the signals applied through V2 partially coincide, and the phase of the code pulses applied to V3 is chosen such that the latter are produced during the periods when the steps of the signals 1 and 2 coincide.

When a code pulse makes the tube V3 conduct, the anode current of the latter passes through the tubes V1 or V2 connected in parallel.

If at this instant the potential of the signal 2 is greater than that of the signal 1 the tube V2 passes all the anode current of V3. In effect, when V2 passes current the potential of the cathode tends to follow that of the grid and the potential of the cathode of V1 reaches the same value. The control grid of V1 being connected to a potential less positive than the cathode, the tube V1 is cut off. Consequently there is received at the terminals of the anode resistance R of V2, a pulse of negative polarity and of constant value.

If on the contrary at the instant of a code pulse the potential of the grid of V1 is greater than that of V2, the tube V2 is cut off and no pulse appears at the terminals of R.

When a pulse appears at the terminals of R, it is simultaneously transmitted to the transmitter circuit 8 on the one hand and to the instantaneous decoder circuit 7 on the other hand, as already described.

It has been stated previously that when one of the tubes V1 or V2 is cut off the other one is conducting. In practice, if the two pulses applied to the control grids of the stages V1 and V2 have very similar amplitudes the two tubes may pass current simultaneously. The current flowing through the two stages being constant and equal to the current delivered by the pentode V3, there is received at the terminals of R, a pulse of which the amplitude has any value between zero and the normal value corresponding to the conditions in which V1 is cut off. When it has a small value it may be transmitted, but does not have a sufficient amplitude to make the instantaneous decoder circuit function, producing the subtraction without being transmitted. If this case occurs at the first instant of the code, there may be an error corresponding to a half of the maximum amplitude transmitted. In order to avoid the possibility of this error, there is arranged between the output of the stage V2 on the one hand, and the instantaneous decoder circuit and the transmission channel (unit 8 of Fig. 4) on the other hand, a threshold amplifier having an infinite gain, that is to say a circuit delivering constant amplitude pulses whatever the input amplitude, always on the condition that it is greater than a predetermined threshold value. By suitably choosing this threshold value one may eliminate the parasitic pulses corresponding to the case where the grid voltage of V2 is slightly less than the grid voltage of V1, and amplify on the contrary, the pulses delivered when this grid voltage is slightly greater than that of V1.

The circuit may be constructed with the aid of a multivibrator circuit of a type well known in the art, for example an Eccles Jordan type of circuit. There are applied, to one of the input terminals of the multivibrator circuit, the pulses received at the terminals of R and to the other tube of this stage pulses which are slightly delayed with respect to the preceding pulses and of the same repetition rate, which serve to return the multivibrator to its first stable position.

In order to obtain a communication system presenting a certain degree of secrecy it may be necessary to modify the code used. There may be done as shown for example in Fig. 10, by means of a circuit passing the code 16–8–4–2–1, in which the necessary scanning of the signal to any code is made. The different instants of the code correspond to the reference amplitudes of which the order of succession is different.

The process used consists essentially in storing the signal in a memory device and in analysing it in a different order. Thus, the circuit comprises in the case of a code of five instants, two groups of five electronic switching circuits 20–24 and 30–34. The first group of circuits serves to charge five condensers to voltages corresponding to the steps of the code, when the instant of the code associated with the switch in question comprises a pulse. These circuits receive the code signal $S_1$ in parallel, and are successively triggered in the order of analysis by pulses produced at the repetition frequency of the signal $S_1$, the order of triggering of the circuits 20–24 corresponds to the order of succession in which the analysis is made. The simultaneous arrival of a code pulse and a triggering pulse assures the connection of the associated condenser to a source of supply so that the charge stored corresponds to the corresponding step of the reference signal R making the analysis. Circuit 25 is an electronic distributor applying the triggering pulses to the various circuits.

The electronic switch circuits 30–34 are connected to the said condenser. They transmit a code pulse to the output circuit when the associated condenser has been charged, at the instant when it receives a triggering pulse furnished by a second distributor circuit 35. The triggering pulses may be sent to the different channels 30–34 in any order.

When a secret communication is effected, for example by modifying the code as has been stated above it may be done automatically by means of synchronising pulses or by manual control, repeating a reference signal R' which corresponds to the amplitude characterising each of the instants of the new code. Such a circuit has been shown in Fig. 11. As is shown, the voltages of the different steps are defined by the intermediate points 1, 2, 4, 8, 16 of a calibration potentiometer fed from a stabilised source of D. C. voltage. The circuits 41, 42, 43, 44, 45, 46 are electronic switching circuits of a known type which connect or isolate the condenser C from the intermediate points on the potentiometer. These switching circuits are controlled by synchronising signals shown on the right hand side of the figure. The latter may be generated by the receiving station from a pulse generator and a distributor device synchronised by certain service signals emitted from the transmitter stage. The electronic switches may equally be automatically controlled from an electronic circuit of the counter type or be manually controlled.

Fig. 12 shows the decoder device proper (circuit 11 of Fig. 4). The left hand side of the figure shows at S the coded signal, and at R' the reference signal, I and J respectively represent two types of synchronising signal. The pulses I have a duration which is equal to that of an instant of the code and produced after the last of each code S. The pulses J comprise very short pulses repeated at a repetition rate equal to the duration of one instant of the code. The amplitude scales of these different signals are very different, the amplitude of the pulses I and of the signal S being of the order of five times that of the signal R'. The signals I and J controlling the synchronisation of the circuit may both be transmitted by the transmitter or produced in the receiver from different synchronisation signals by means well known in the art and separated in the circuit 10 of Fig. 4.

As is shown in the drawing, the reference signal R feeds a cathode follower tube V4 of which the load resistance $R_1$ is joined to a point of fixed potential which may be earth potential. The potential of point M at the other end of the resistance $R_1$ follows the variation of the reference signal. This potential is equal to that of the cathode of the diode V5.

On the other hand the application of a positive pulse I to the grid of the tube V1 which is normally cut off assures the connection of the condenser C1 to the terminals of a source of direct voltage represented by the sign +. The voltage at the terminals of this supply is almost entirely applied to the terminals of C1, the condenser charging positively with respect to earth potential to a known constant value. The charge of the condenser is effected during the quiescent period separating the arrival of two successive signals S. At these instants the tubes V2 and V3 are cut off.

In effect a pulse identical to the pulses I is applied through C4 on to the grid of V2 which is sufficient to overcome the negative bias voltage applied to this electrode from an auxiliary source not shown on the figure. The voltage of this grid reaches a stable value corresponding to that of the point M. The diode V5 taken to the potential of the grid of V2, goes beyond that of M in effect, and under these conditions the diode conducts, which immediately lowers the potential of the grid and the condenser C4 charges negatively.

The potential M being obtained at a low impedance, the charge current of C4 has only a negligible influence on its value. The potential of the cathode of V2 is initially zero. It has a tendency to reproduce the variations of the grid potential, consequently the condenser C2 and the condenser C3 in parallel charge so that the potential of the cathode of V2 has the same value as that of the grid except for the cut off voltage of the tube. The potential of the cathode of V2 therefore attains except for the cut off potential of the tube, the potential of M at the instant of the signal I. At the end of the signal I the tubes V1, V2, V3 are cut off and the various charges remain stored in the condensers C1, C2, C3.

When a code pulse S appears, it has in effect to carry the potential of the grid of V2 to the potential of M, at the instant considered, by the process already described. This potential augments the value of the step of the signal R' corresponding to the instant of the code being considered.

The tube V2 is made conducting and C1 therefore discharges through V2. The charge which it loses is gained by C2 (C3 being out of circuit since V3 remains cut off).

The discharge of C1 ceases when the potential of C2 reaches the potential of the grid save for the cut-off potential. If it is arranged that this cut-off voltage does not vary from one moment to another (which implies that the cathode-plate potential remains nearly constant) it will be seen that the addition to the voltage of C2 is equal to the value of the step R at the moment considered. C1 has therefore lost a voltage proportional to the reference voltage R' at the moment of the pulse caused by the signal S.

At the end of this operation, one of the pulses J triggers V3 which effectively puts C3 in parallel with C2 and consequently returns C2 to its initial potential. It is necessary that the capacity of C3 is sufficiently large in relation to that of C2 in order that the charges lost by C2 do not substantially increase its potential. During this operation V2 is cut off.

The following code pulses may however repeat the operation and C1 lose a voltage proportional to the new step of R associated with the corresponding instant of code.

The decoder circuit may also function when the coding is effected in a system employing any other base. Under these conditions, the code pulses present different levels, the number of these levels being equal to the base of the coding system less one unit (one of the units of the system corresponding to the zero level, that is to say to the absence of a pulse). In order to use the circuit according to the invention in such a system, it is sufficient to arrange as many discharge circuits in parallel with the condenser C1, that is to say as many circuit arrangements of the tube V2–condenser C2, as there are different reference levels. The voltages of the different tubes V2 are chosen to vary as a function of the different reference levels. As a variation one may arrange in the grid circuits of the different stages V2, amplitude limiter circuits, only transmitting to the corresponding tube code pulses of which the amplitude passes a given level. By choosing the condensers C2 to have the same capacity as the condenser C1, one may cut off the same charge many times at the terminals of C1.

There is shown in Fig. 13 an embodiment of the decompressor circuit 13 associated with the compressor 3 (of Fig. 4). The incident signals S'$_2$ after decoding, feed a comparison circuit 51 performing two functions, it may direct the signal S'$_2$ either towards the chain comprising the switching means 57a or towards the chain comprising the switching means 57b according to whether the amplitude of the incident pulse is greater or less than the reference level corresponding to the mean level of the signal which will be detected, and which in the embodiment described is earth potential. The circuit 51, known in itself may be of the two channel electronic switch type. It also provides a control pulse when the difference of potential at one point of the circuit is equal to the amplitude of S'$_2$.

The switching means 57a and 57b when they are triggered connect the RC circuit respectively to a source of voltage $+V_0$ and a source of voltage $-V_0$ as has been said.

The closing of the switch means 57a and 57b is controlled by the gating circuits 58a and 58b receiving in addition to the signals S'$_2$ sorted through the comparison circuit 51, control pulses produced at the moment when the difference of potential at the terminals C is equal to the amplitude of the signal S'$_2$. A switching arrangement 59 assures the discharge of the condenser C when a marking has been effected. The pulse I'$_3$ received at the terminals of the condenser C, feed the circuit 52 performing the opposite function to that of the circuits 2a and 2b used at the transmitter, and is provided to transform, if so desired the pulse I'$_3$ modulated in duration into pulses I'$_2$ modulated in amplitude. The latter are sent to the accumulation circuit then to the amplifier BF.

The embodiment of the compression circuits and decompression circuits (Figs. 6 and 13) which have been described give very good results. They necessitate however a large number of tubes and circuits, and ensure a quality which is not always necessary, notably in the case of control or service channels. There will now be described compression and decompression circuits of much simpler construction than the preceding ones, they give an "amplitude to amplitude" characteristic comprising an approximation of the exponential or logarithmic curve obtained (see Fig. 5b) and essentially comprise a series of sections at different inclinations as is shown on Figs. 15 and 17. It is essential to produce a sufficiently accurate similarity of the curves (slopes and bends of the characteristics) of Figs. 15 and 17 in order that the addition of two changes may be equal to a linear transformation of the amplitudes. The circuits of Figs. 14 and 16 which are only simple amplifiers with a gain varying as a function of the reference level of the incident signal, are constructed in a manner to ensure that their characteristics are not modified by the performance of the tubes or by the fluctuations of the voltage sources feeding these tubes. The coincidence between the symmetric centres of the curves of Figs. 15 and 17, and that of the curves is assured, according to the invention by the transmission of a single supplementary information signal, this information signal or control level, being a signal tied to the instantaneous value of the anode voltage feeding the stages constituting the compressor.

The points of intersection of the different sections constituting the curve, or the bends of the characteristic, correspond to the steps of the coding reference signal and their amplitudes fluctuate in the same direction. This is obtained by modulating the amplitude of the signals controlling the reference signal generator (for example the signals s of the Fig. 7c) with the variations of the anode voltage of the stages constituting the compressor. The stability of the amplitude level corresponding to the symmetric centre of the compression curve is assured by a feedback operation of the stages constituting the circuit of compression or decompression, in opposition to the fluctuations of any current delivered by the associated high tension supply, these circuits acting in effect, under such conditions, as constant resistances. Thus the fluctuations of the high tension supply can only be brought about by variations related to the curves of compression and decompression and it is therefore sufficient in order to obtain the coincidence of the two curves to provide a single control parameter characterising the said high tension fluctuation.

According to a preferred embodiment of the invention, a symmetrical arrangement is used comprising two amplifier stages, which feed in parallel a constant current through a third stage also acting as a constant resistance towards the fluctuations of the supply source and as a high resistance to the modulation frequencies. In this case, variations of the characteristics of the two tubes destroys the balance of the symmetrical circuit.

Fig. 14 shows an embodiment of a compression circuit corresponding to the characteristic curve of Fig. 15 comprising five straight sections. As is shown the circuit is made symmetrical by the use of two tubes $T_1$ and $T_2$ acting as a variable charge amplifier with a different gain according to the level of the input signal. The voltages V1, V2 and V3, etc., of the bends are obtained by joining through resistances $P_1$, $P_2$, $P_3$ . . . etc., the anodes to the intermediate points of a voltage divider P connected between earth and a source of high tension supply HT+.

The anode circuits of $T_1$ and $T_2$ essentially comprise resistances connected between the anode and intermediate points on the voltage divider, at the potentials V2, V3, V4, and V5. Between the lower extremities of the resistances and the tubes $T_1$ there have been introduced diodes which conduct when the anode potential permits them. The different voltages V2, V3, V4 and V5 are chosen so that V2<V3<V4<V5 as is seen on the curve of Fig. 15. The voltage and resistance values are chosen so that when the amplitudes of the input signal $V_{g0}$ corresponds to the axis of symmetry of the latter the diodes are cut off. This happens at the centre of symmetry A of the characteristic curve and the anode voltage or output voltage $V_s$ has the value $V_{s0}$. If the amplitude of the incident signal increases, the tube conducts more and its anode potential falls. When the latter reaches a value slightly lower than the voltage V3, one diode must conduct and the tube then has a load impedance corresponding to putting in parallel two resistances. This is shown at the point B on the characteristic curve. Inversely if the incident signal reduces from the value $V_{s0}$ the anode potential increases and when it has reached a value slightly greater than V4 (the point C on the characteristic curve) the tube then has a broad impedance corresponding to putting in parallel two other resistances.

The use of a symmetrical circuit assures the elimination of even harmonics which may cause distortion and on the other hand eliminates the necessity of decoupling the intermediate points on the potentiometer P. As is shown, the tubes $T_1$ and $T_2$ have connected between anode and control grid two resistances $R'_1$ and $R'_2$ whose function will be stated later. The voltages of the Tubes $T_1$ and $T_2$ are chosen so that in the absence of the incident signal the anode voltages are equal and corresponding to the values $V_{s0}$ of the centre of symmetry of the curve. Another characteristic essential to the circuits according to the invention resides in the tube $T_3$ connected in the cathode circuit of the tubes $T_1$ and $T_2$. When the compressor of Figure 14 is used in a coded transmission system it is necessary to reproduce, in the absence of the incidence signal, on the anodes of the two tubes $T_1$ and $T_2$ at M and M' the potential of the point P within a few tenths of one percent. It is therefore necessary that the currents circulating in the resistances $R_4$ and $R_5$ of the bridge are equal to the same degree. This is effected by the resistances $R'_1$ and $R'_2$ and $R'_3$ which are large in respect to those of the bridge and are connected respectively between M and M' and earth and between the cathodes of the tubes $T_1$ and $T_2$ and earth. To the high tension supply fluctuations, the tubes $T_1$ and $T_2$ therefore act as constant pure resistances as does the tube $T_3$. The grid potential of these tubes varies as their anode potential, at the frequency of the modulation signal, the grids of the tubes $T_1$ and $T_2$ being connected to earth as is that of $T_3$. The cathode resistance $R_6$ of this latter tube assures a large feed-back at these frequencies. This tube essentially acts to maintain constant the sum of the currents circulating in the tubes $T_1$ and $T_2$, which help to maintain the symmetry of the circuit. Furthermore the addition of the tube $T_3$ permits the feeding of the circuit by means of a voltage applied between earth and the control grid of one of the stages $T_1$ or $T_2$. The tube $T_3$ by maintaining constant the sum of the current delivered by these tubes permits the triggering of the second stage. The compressed signal is received at the anode of one or other of the tubes $T_1$ or $T_2$.

The use of tube $T_3$ and of resistances $R'_1$ and $R'_2$ prevents, as has been said above, any distortion of the compression curve other than sharp distortions.

As has been said previously, these latter are not inconvenient since it is sufficient to transmit a supplementary information signal relative to the value of the high tension at the moment of the compression in order to distort the expansion curve in the same manner.

As has been said above, it is preferable to choose values of potential corresponding to the intermediate point on the potentiometer P, as the value of the anode resistances, so that the characteristic curves (BCDE) correspond to the amplitudes transformed into a known code, that is to say to the amplitude levels of the reference signal. It is well known that the number of bends of the transmission characteristic curve may be any number and may be less than the number of levels of the reference signal.

Fig. 16 shows an expansion circuit which may be associated with the compression circuit which has been described. The same impedance network is connected in the common cathode circuit of the two stages $T'_1$ and $T'_2$ and has the inverse function of the anode network of the tubes $T_1$ and $T_2$ of the compression circuit. As previously, two tubes are used in order to produce a symmetrical circuit which permits the elimination of the even harmonics due to the distortion.

I claim:

1. A pulse code modulation system, comprising means for producing groups of pulses corresponding to the instantaneous values of a modulation signal, a compression circuit for compressing said pulses, a supply voltage for said compression circuit, means for coding said pulses, a transmitter for transmitting said coded pulses, means for transmitting a control signal varying in relation to the instantaneous value of the supply voltage feeding said compression circuit, a receiver for receiving the transmitted coded pulses, and said control signal, means for decoding said pulses, a decompression circuit in said receiver for decompressing said decoded pulses, a supply voltage for said decompression circuit, means for applying said control signal to said decompressor circuit so that the supply voltage of the decompressor circuit varies as the supply voltage feeding said compression circuit, and means for producing a signal corresponding to the modulation signal at the transmitter from said decoded pulses.

2. In a pulse code modulation system, a compression circuit, comprising an amplifier stage having a gain which varies as a function of the reference level of the input signal a high tension supply voltage feeding said amplifier, and means for controlling the variation of the gain of said amplifier independent of fluctuations in the high tension supply voltage feeding said amplifier, comprising a control valve connected in series with the cathode current circuit of the amplifier and means for varying the conductance of said control valve in dependence upon the fluctuations in the said high tension supply whereby the cathode current of the amplifier remains constant relative to said fluctuations in said high tension supply.

3. A pulse code modulation system, comprising means for producing a modulation signal which is to be transmitted, means for deriving a series of pulses varying in amplitude as a function of the instantaneous amplitude of the modulation signal, an instantaneous amplitude compression circuit for compressing said series of pulses, a synchronising signal generator, a reference signal generator fed from the output of the synchronising signal generator, a coding circuit, means for feeding the reference signal from said reference signal generator to said coding circuit, means for feeding the compressed pulses to said coding circuit, an instantaneous decoding circuit fed from said reference signal generator, means for feeding the output from said instantaneous decoding circuit to said coding circuit, said coding circuit producing an output signal when the amplitude of said compressed pulses in combination with said reference signal exceeds the instantaneous amplitude of said decoding signal, means for transmitting the output signals from said coding circuit, a receiver for receiving said transmitted signals, comprising an amplifier circuit, a separator circuit fed from said amplifier for separating the reference signals from the coded pulses, a decoding circuit for decoding the coded pulses, an instantaneous amplitude decompression circuit fed from the decoder circuit for decompressing the coded pulses, means for controlling the characteristic of the decompression circuit in accordance with the characteristic of the compression circuit and reproducing means for reproducing the signals from said decompressor circuit.

4. A pulse code modulation system, comprising means for producing a modulation signal to be transmitted, means for deriving a series of pulses varying in amplitude as a function of the instantaneous amplitude of the modulation signal, an instantaneous amplitude compression circuit for compressing said series of pulses, a synchronising signal generator, a reference signal generator fed from the output of the synchronising signal generator, and producing a reference signal with which said series of pulses are compared, a coding circuit means for feeding the reference signal to said coding circuit means for feeding the series of pulses to said coding circuit, an instantaneous decoding circuit fed from said reference signal generator, the output of said instantaneous decoding circuit feeding said coding circuit, means for producing an output from said coding circuit when the amplitude of said pulses in combination with said reference signal exceeds the instantaneous amplitude of said decoding signal, secrecy means for changing the order of the pulses in each group of pulses produced from said coding circuit, means for transmitting the output signals from said secrecy circuit, a receiver for receiving the signals emitted from the transmitter, comprising a separator circuit for separating the reference signals from the coded pulses means for restoring the order of the pulses in each group to that produced by said coding circuit in the transmitter, a decoding circuit fed from said separator circuit for decoding the coded pulses, an instantaneous amplitude decompression circuit fed from the decoding circuit for decompressing the decoded pulses, means for controlling the characteristic of the decompression circuit in accordance with the characteristic of the compression circuit and reproducing means for reproducing the signals from said decoding circuit.

5. A pulse code modulation system, comprising means for producing a modulation signal to be transmitted, means for deriving a series of pulses varying in amplitude as a function of the instantaneous amplitude of the modulation signal, a compression circuit for compressing said series of pulses, a high tension supply feeding said compression circuit, means for deriving a control signal varying as a function of the fluctuations of said high tension supply, a synchronising signal generator, a reference signal generator fed from the output of the synchronising signal generator, and producing a reference signal with which said compressed pulses are compared, a coding circuit means for feeding the reference signal to said coding circuit means for feeding the compressed pulses to said coding circuit, an instantaneous decoding circuit fed from said reference signal generator, the output of said instantaneous decoding circuit feeding said coding circuit, means for producing an output from said coding circuit when the amplitude of said compressed pulses in combination with said reference signal exceeds the instantaneous amplitude of said decoding signal, secrecy means for changing the order of the pulses in each group of pulses produced from said coding circuit, means for transmitting the output signals from said secrecy circuit, means for transmitting said control signal, a receiver for receiving the signals emitted from the transmitter, comprising a separator circuit for separating the reference signals from the coded pulses, means for restoring the order of the pulses in each group to that produced by said coding circuit in the transmitter, a decoding circuit fed from said separator circuit for decoding the coded pulses, a decompressor circuit fed from the decoder circuit for decompressing the decoded pulses, a high tension supply feeding said decompressor circuit, means for feeding said control signal to said decompressor circuit to control the fluctuations of said high tension supply voltage in accordance with the fluctuations of the high tension supply feeding the compressor circuit at the transmitter, and reproducing means for reproducing the signals from said decompressor circuit.

6. In a pulse code modulation system comprising a transmitter and a receiver, a signal compression arrangement comprising an instantaneous amplitude compression circuit at the transmitter, a supply voltage for said compression circuit and an instantaneous amplitude decompression circuit at the receiver, a supply voltage for said decompression circuit and means for maintaining the similarity of the operating characteristics of said compression circuit at the transmitter and said decompression circuit at the receiver, said means consisting of a control signal generated at the transmitter and varying in relation to the instantaneous value of the supply voltage feeding the compression circuit and means for feeding the control voltage to the decompression circuit at the receiver to control the supply voltage of the decompression circuit so that said supply voltage to said decompression circuit varies as the supply voltage feeding the compression circuit.

7. A pulse code modulation system, comprising means for producing groups of pulses corresponding to the instantaneous values of a modulation signal, an instantaneous amplitude compression circuit for compressing said pulses comprising an amplifier stage having a gain which varies as a function of the reference level of the input signal, a high tension supply for said amplifier, and means for controlling the variation of the gain of said amplifier independent of fluctuations in the high tension supply feeding said amplifier, said control means comprising a valve connected in series with the cathode current circuit of said amplifier and means for varying the conductance of said control valve in dependence upon the fluctuations in the high tension supply whereby the cathode current of the amplifier remains constant relative to said fluctuations in said high tension supply, means for transmitting a control signal varying in relation to the fluctuations in said high tension supply feeding said compression circuit, a receiver for receiving the transmitted coded pulses and said control signal, means for decoding said pulses, an instantaneous amplitude decompression circuit in said receiver for decompressing said decoded pulses, means for applying said control signal to said decompression circuit so that the supply voltage of the decompression circuit varies as the supply voltage feeding said compression circuit and means for producing a signal corresponding to the modulation signal at the transmitter from said decoded pulses.

8. A pulse code modulation system as claimed in claim 7, wherein the amplifier stage is a balanced arrangement comprising two amplifying valves connected in parallel with each other, and in series with said control valve.

9. A pulse code modulation system as claimed in claim 8, comprising a plurality of rectifiers each having one electrode connected to the anode of each amplifier valve and the other electrode connected respectively to different points on a voltage divider connected across said high tension supply.

10. A pulse code modulation system, comprising means for producing groups of pulses corresponding to the instantaneous values of a modulation signal, an instantaneous amplitude compression circuit for compressing said pulses, comprising an amplifier stage having a gain which varies as a function of the reference level of the input signal, a high tension supply for said amplifier and means for controlling the variation of the gain of said amplifier independent of fluctuations in the high tension supply feeding said amplifier, said control means comprising a valve connected in series with the cathode current circuit of said amplifier a potentiometer connected across said high tension supply and to the control grid of said control valve for varying the conductance of said control valve in dependence upon the fluctuations in the high tension supply, means for transmitting the coded pulses, a receiver for receiving the transmitted coded pulses and said control signal, means for decoding said pulses, an instantaneous amplitude decompression circuit in said receiver for decompressing said decoded pulses, means for controlling the characteristic of said decompression circuit in accordance with the characteristic of the compression circuit, and means for producing a signal corresponding to the modulation signal at the transmitter from said decoded pulses.

11. A pulse code modulation system as claimed in claim 10, wherein the amplifier stage is a balanced arrangement comprising two amplifying valves connected in parallel with each other, and in series with said control valve.

12. A pulse code modulation system as claimed in claim 11, comprising a plurality of rectifiers having one electrode connected to the anode of each amplifier valve and the other electrode connected respectively to different points on a voltage divider connected across said high tension supply.

13. A pulse code modulation system, comprising means for producing groups of pulses corresponding to the instantaneous values of a modulation signal, an instantaneous amplitude compression circuit for compressing said pulses comprising a balanced amplifier stage having a gain which varies as a function of the reference level of the input signal, a high tension supply for said amplifier and means for controlling the variation of the gain of said amplifier independent of fluctuations in the high tension supply feeding said amplifier, said control means comprising a valve connected in series with the cathode current circuit of said amplifier and means for varying the conductance of said control valve in dependence upon the fluctuations in the high tension supply whereby the cathode current of the amplifier remains constant relative to said fluctuations in said high tension supply, means for transmitting the coded pulses, means for transmitting a control signal varying in relation to the fluctuations in said high tension supply feeding said compression circuit, a receiver for receiving the transmitted coded pulses and said control signal, means for decoding said pulses, an instantaneous amplitude decompression circuit in said receiver for decompressing said decoded pulses, comprising a balanced amplifier stage, means for applying said control signal to said decompression circuit so that the supply voltage of the decompression circuit varies as the supply voltage feeding said compression circuit and means for producing a signal corresponding to the modulation signal at the transmitter from said decoded pulses.

14. A pulse code modulation system as claimed in claim 13, wherein the compression circuit comprises two amplifier valves, a resistance connected between the anode of each of said amplifier valves and a point of fixed potential means connecting the control grid of each amplifier valve to an intermediate point on the associated resistance means connecting the cathodes of each of said amplifier valves to the anode of the control valve and to a resistance connected in parallel with said control valve and means connecting the control grid of said control valve to an intermediate point on said latter resistance.

15. A pulse code modulation system as claimed in claim 13, wherein the instantaneous amplitude decompression circuit comprises two amplifier valves and the cathode of each of said amplifier valves is connected through a plurality of rectifiers to different points on a voltage divider connected across the high tension supply.

16. A pulse code modulation system as claimed in claim 15, comprising means connecting the control grids of said amplifier valves to tapping points on potentiometers connected across the high tension supply.

17. In a pulse code modulation system, a signal compression circuit comprising a balanced amplifier stage having a gain which varies as a function of the reference level of the input signal and consisting of two electronic amplifier valves each of said valves having an anode and cathode and at least one control grid, a high tension supply, a resistor network connected across said high tension supply, a first group of rectifiers, each of said first group of rectifiers having one of their electrodes connected to the anode of one of said amplifier valves, and the other of their electrodes respectively connected to points of different potential on said resistor network, a second group of rectifiers, each of said second group of rectifiers having one of their electrodes connected to the anode of the other of said amplifying valves and the other of their electrodes respectively connected to said points of different potential on said resistor network, a potentiometer connected across said high tension supply, means connecting the control grids of each of said amplifier valves to said potentiometer, and a control valve connected in series with the cathode circuit of said amplifier valves for controlling the variation of the gain of said amplifier valves independent of fluctuations in said high tension supply.

18. In a pulse code modulation system, a signal compression or decompression circuit comprising a balanced amplifier stage having a gain which varies as a function of the reference level of the input signal and consisting of two electronic amplifier valves each of said valves having an anode and cathode and at least one control grid, a high tension supply, a resistor network connected across said high tension supply, a first group of rectifiers each of said first group of rectifiers having one of their electrodes connected to the anode of one of said amplifier valves, and the other of their electrodes respectively connected to points of different potential on said resistor network, a second group of rectifiers, each of said second group of rectifiers having one of their electrodes connected to the anode of the other of said amplifying valves and the other of their electrodes respectively connected to said points on said resistor network, a potentiometer connected across said high tension supply, means connecting the control grids of each of said amplifier valves to said potentiometer, and means for controlling the variation of the gain of said amplifier stage independent of fluctuations in the high tension supply feeding said amplifier valves.

19. In a pulse code modulation system, a signal decompression circuit comprising a balanced amplifier stage having a gain which varies as a function of the reference level of the input signal consisting of two electronic amplifier valves connected in parallel, each of said valves having an anode and cathode and at least one control grid, a high tension supply, a resistor network connected across said high tension supply, a first group of rectifiers, each of said first group of rectifiers having one of their electrodes connected to the anode of one of said amplifier valves, and the other of their electrodes respectively connected to points of different potential on said resistor network, a second group of rectifiers, each of said second group of rectifiers having one of their electrodes connected to the anode of the other of said amplifying valves and the other of their electrodes respectively connected to said points of different potential on said resistor network, means connecting the control grids of each of said amplifier valves to a point of potential derived from said high tension supply and means for controlling the variation of the gain of said amplifier stage independent of fluctuations in the high tension supply feeding said amplifier valves.

References Cited in the file of this patent
UNITED STATES PATENTS

| Number | Name | Date |
| --- | --- | --- |
| 2,207,571 | Andrews | July 9, 1940 |
| 2,364,210 | Guanella | Dec. 5, 1944 |
| 2,402,059 | Craib | June 11, 1946 |
| 2,438,908 | Goodall | Apr. 6, 1948 |
| 2,464,607 | Pierce | Mar. 15, 1949 |
| 2,473,457 | Tyson | June 14, 1949 |
| 2,480,201 | Selove | Aug. 30, 1949 |
| 2,511,671 | Jacob | June 13, 1950 |
| 2,521,733 | Lesti | Sept. 12, 1950 |
| 2,527,638 | Kreer et al. | Oct. 31, 1950 |
| 2,531,846 | Goodall | Nov. 28, 1950 |
| 2,572,900 | Winkler | Oct. 30, 1951 |
| 2,632,058 | Gray | Mar. 17, 1953 |